US012791496B2

(12) United States Patent
Zeitoun

(10) Patent No.: US 12,791,496 B2
(45) Date of Patent: Nov. 10, 2026

(54) PHASE-CONTRAST IMAGING METHOD FOR ESTIMATING THE LOCAL STOICHIOMETRY OF A SAMPLE

(71) Applicants: ECOLE POLYTECHNIQUE, Palaiseau (FR); ECOLE NATIONALE SUPERIEURE DES TECHNIQUES AVANCEES, Palaiseau (FR); CENTRE NATIONAL DE LA RECHERCHE SCIENTIFIQUE, Paris (FR)

(72) Inventor: Philippe Zeitoun, Paris (FR)

(73) Assignees: ECOLE POLYTECHNIQUE, Palaiseau (FR); ECOLE NATIONALE SUPERIEURE DES TECHNIQUES AVANCEES, Palaiseau (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 157 days.

(21) Appl. No.: 18/717,887

(22) PCT Filed: Dec. 2, 2022

(86) PCT No.: PCT/EP2022/084261
§ 371 (c)(1),
(2) Date: Jun. 7, 2024

(87) PCT Pub. No.: WO2023/117376
PCT Pub. Date: Jun. 29, 2023

(65) Prior Publication Data

US 2025/0044243 A1 Feb. 6, 2025

(30) Foreign Application Priority Data

Dec. 23, 2021 (FR) ...................................... 2114352

(51) Int. Cl.
*G01N 23/041* (2018.01)
*G01N 23/046* (2018.01)

(52) U.S. Cl.
CPC ......... *G01N 23/041* (2018.02); *G01N 23/046* (2013.01)

(58) Field of Classification Search
CPC ... G01N 23/041; G01N 23/046; G01N 23/087
See application file for complete search history.

(56) References Cited

U.S. PATENT DOCUMENTS 6,950,493 B2 * 9/2005 Besson .................. A61B 6/032 378/16
2010/0327175 A1 * 12/2010 Nesterets .............. G02B 27/52 250/393

(Continued)

FOREIGN PATENT DOCUMENTS

EP 2934320 A1 10/2015
EP 2934320 B1 * 3/2020 ............. A61B 6/482

OTHER PUBLICATIONS

Begani Provinciali, Modelling of Phase Contrast Imaging with X-ray Wavefront Sensor and Partial Coherence Beams. 2020 Sensors , 1-13 (Year: 2020).*

(Continued)

*Primary Examiner* — Uzma Alam
*Assistant Examiner* — Soorena Kefayati
(74) *Attorney, Agent, or Firm* — Greer, Burns & Crain, Ltd

(57) ABSTRACT

An imaging method for determining a parameter δ of real and imaginary parts of a sample complex optical index; the method using an X-ray source to illuminate the sample, a perforated grating arranged between the sample and the detector, and a signal processing unit; the method performing measurement while illuminating the sample, the X-rays reaching the detector forming a spot for each grating hole;

(Continued)

for each measurement and for each grating hole, analysing the grating spot by determining a spot barycenter using a centroid-finding technique, determining an offset of the barycenter relative to a reference barycenter and determining a local phase variation via the offset of the barycenter, determining an amplitude of the X-rays forming the spot and determining a local attenuation relative to a reference amplitude, determining the parameter δ on the basis of the local phase variation, and determining the imaginary part β via the local attenuation.

17 Claims, 3 Drawing Sheets

(56) References Cited

U.S. PATENT DOCUMENTS

| | | | | |
|---|---|---|---|---|
| 2014/0185896 | A1 * | 7/2014 | Baturin | A61B 6/032 382/131 |
| 2015/0110247 | A1 * | 4/2015 | Baturin | A61B 6/482 378/62 |
| 2019/0206652 | A1 * | 7/2019 | Akinwande | G01N 23/041 |
| 2020/0085392 | A1 * | 3/2020 | Lanza | G01N 23/041 |
| 2021/0151288 | A1 * | 5/2021 | Lanza | H01J 37/244 |

OTHER PUBLICATIONS

International Search Report and Written Opinion received for PCT/EP2022/084261, mailed Jan. 20, 2023.

International Preliminary Report on Patentability received for PCT/EP2022/084261, mailed Aug. 16, 2023.

Fornaro, J., et al., "Dual- and multi-energy CT: approach to functional imaging," Insights Imaging 2, 2011, pp. 149-159.

Munro, P., et al., "A simplified approach to quantitative coded aperture X-ray phase imaging," Optics Express, vol. 21, No. 9, May 6, 2013, pp. 11187-11201.

Provinciali, G., et al., "Phase-Contrast Tomography with X-ray Hartmann wavefront sensor," International Conference on X-Ray Lasers, Proceedings of SPIE, Online Only, vol. 11886, 2020, 8 pages.

Schäfer, B., et al., "Wavefront and Coherence Characteristics of Extreme UV and Soft X-ray Sources," Chapter 20, Nanoscale Photonic Imaging, Topics in Applied Physics 134, 2020, pp. 531-548. (Correction included, 1 page.).

Spiricon, Inc., "Hartmann Wavefront Analyzer Tutorial," Laser Beam Diagnostics, Part No. 10885-001, Rev. D, 2004, 19 pages.

Vittoria, F., et al., "Multimodal Phase-Based X-Ray Microtomography with Nonmicrofocal Laboratory Sources," Physical Review Applied 8, 2017, pp. 064009-1 to 064009-9.

Wen, H., et al., "Single-shot x-ray differential phase contrast and diffraction imaging using two-dimensional transmission gratings," Opt Lett. 35(12), Jun. 15, 2010, 8 pages.

* cited by examiner

[Fig. 1]
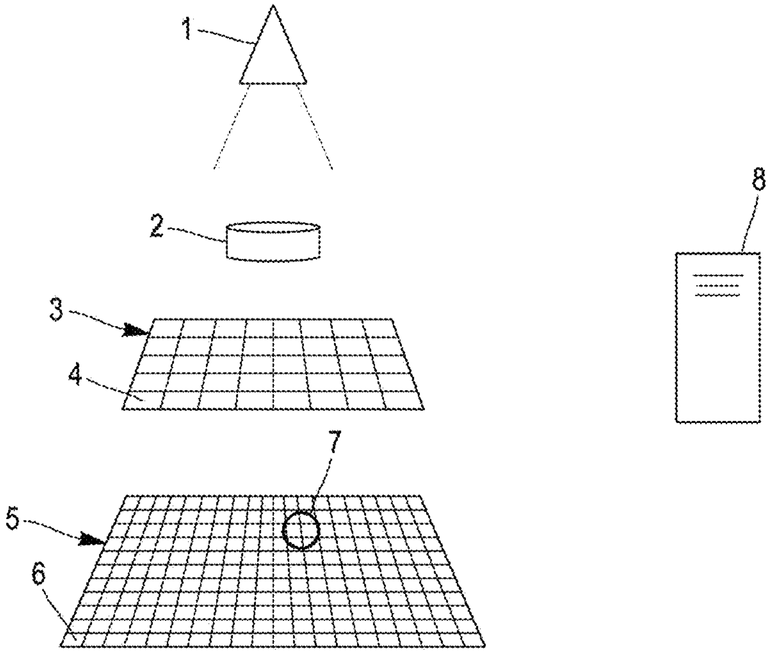
[Fig. 2]
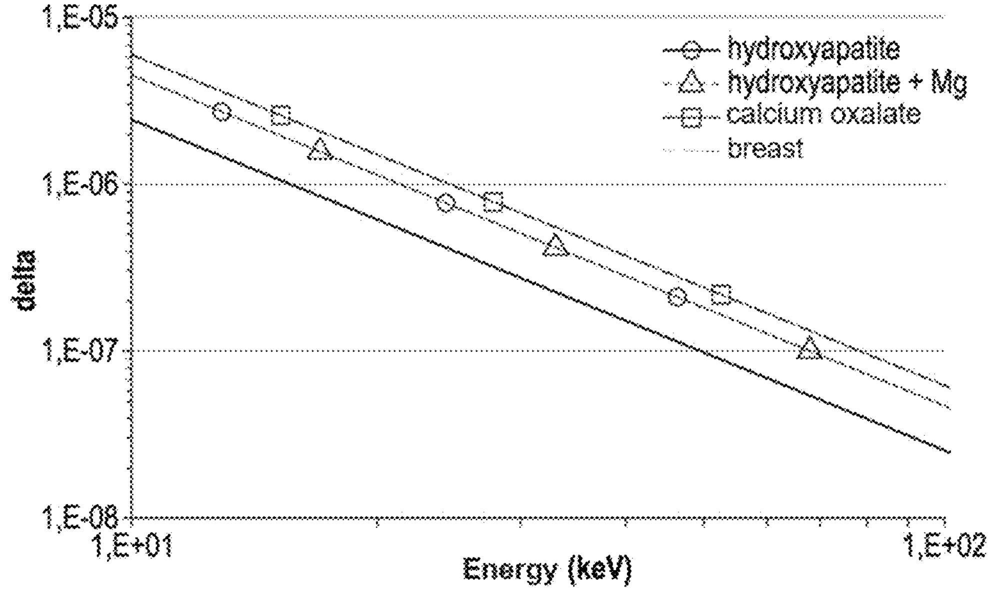

[Fig. 3]
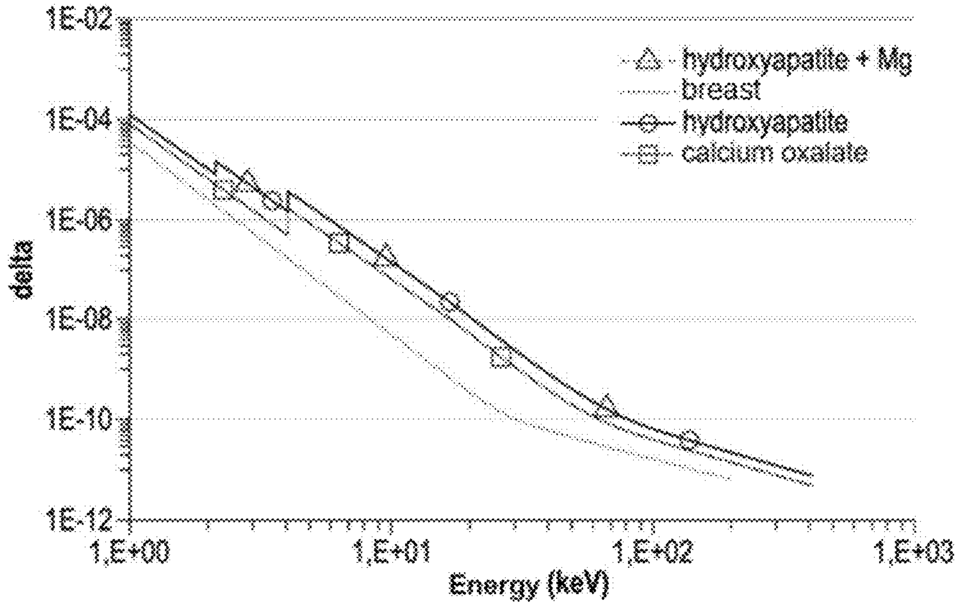
[Fig. 4]
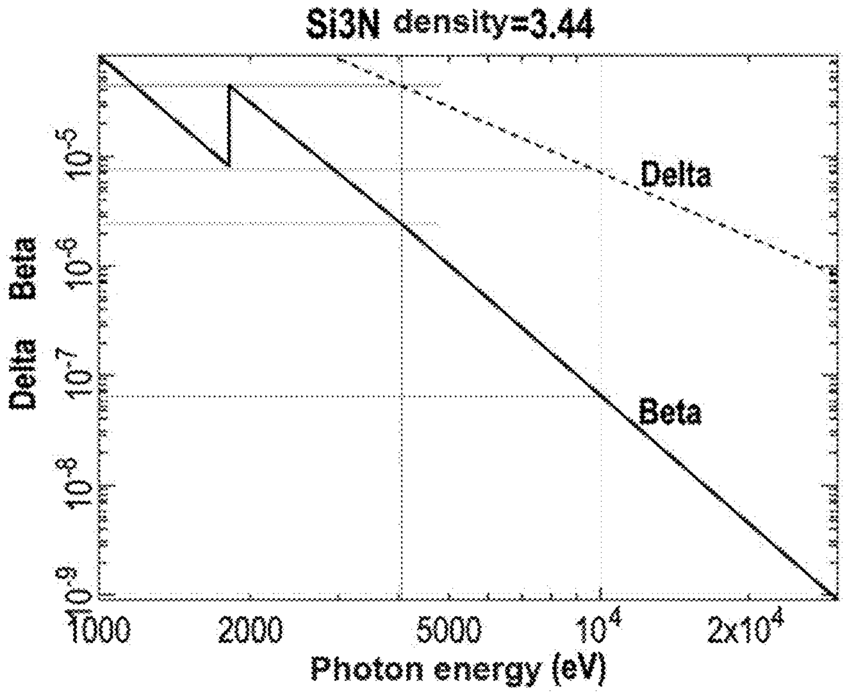

[Fig. 5]
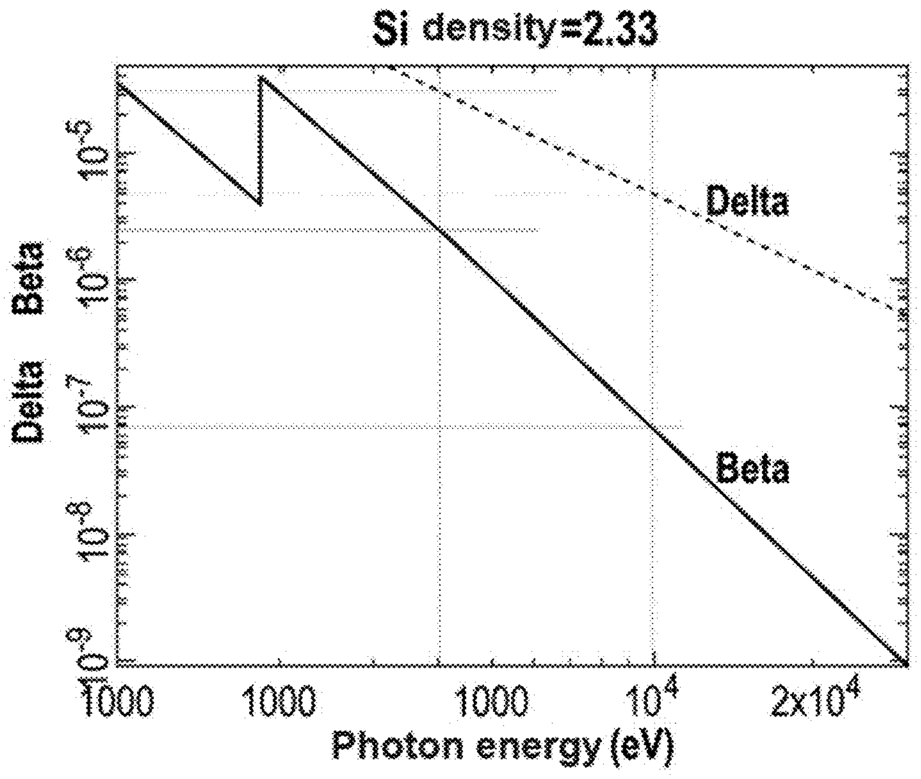

PHASE-CONTRAST IMAGING METHOD FOR ESTIMATING THE LOCAL STOICHIOMETRY OF A SAMPLE

BACKGROUND

This invention relates to a phase-contrast imaging method for estimating local stoichiometry of a sample by determining a parameter δ of a real part and an imaginary part β of a complex optical index of the sample. It finds a particularly interesting application in the field of cancer treatment for quantifying nanoparticles. However, the scope of the invention is broader, since it can be applied to the medical field in general, to agri-food, cultural heritage, energy, materials science, etc.

Generally speaking, the X-ray technique can be used to measure total density qualitatively, without measuring chemical composition. A first improvement consisted in producing two absorption images at two energies and thus measuring density of human bones, for example. This is the 'dual-photon X-ray absorptiometry' technique. It can be observed that this technique is based solely on absorption, and therefore very indirectly on estimating the imaginary part of the optical index of a sample.

In some specific cases, it is possible to image a sample below and then above an atomic threshold to quantify presence of a specific element. But this technique includes two major limitations. Firstly, it gives no indication of the other elements in the sample. Secondly, if the element of interest has a low atomic number, the atomic thresholds are located at low energy, which makes it impossible to image slightly thicker objects, such as an animal or the human body. For example, for Iron, the thresholds are below 7.1 keV.

Document U.S. Pat. No. 6,950,493B2 is known, describing a multi-spectral X-ray imaging system. The source spectrum is varied in order to improve contrast of the images acquired.

Document 'Dual- and multi-energy CT: approach to functional imaging', Juergen Fornaro et al, European Society of Radiology 2011, describes a multi-energy source system for characterising several materials.

Document 'A simplified approach to quantitative coded aperture X-ray phase imaging', Peter R. T. Munro et al, 2013 Optical Society of America, describes the use of two grids to define coding and quantify composition of a sample in a phase-contrast imaging system.

Document 'Multimodal Phase-Based X-Ray Microtomography with Nonmicrofocal Laboratory Sources', Fabio A. Vittoria et AL, PHYSICAL REVIEW APPLIED 8, 064009 (2017), describes a phase-contrast imaging system using a grid placed between the X-ray source and the sample. This arrangement involves numerous approximations that are detrimental to the efficiency of the system. The system additionally requires several acquisitions before the index parameters can be determined.

Document 'Single-shot x-ray differential phase-contrast and diffraction imaging using two-dimensional transmission gratings', Harold H. Wen et al, OPTICS LETTERS/Vol. 35, No. 12/Jun. 15, 2010, describes a phase-contrast imaging system using a grid. A Fourier Transform is applied to the whole image obtained to quantify the sample.

The purpose of the present invention is a method for quantifying a sample by determining its chemical composition.

Another purpose of the invention is a new robust method for rapidly determining this chemical composition using X-rays.

SUMMARY

At least one of the aforementioned objectives is achieved with a phase-contrast imaging method for estimating local stoichiometry of a sample by determining a parameter δ of a real part and an imaginary part β of a complex optical index of the sample; this method is implemented using an X-ray source for illuminating the sample disposed between the source and a detector, a grid consisting of holes disposed between the sample and the detector, and a unit for processing signals from the detector;

the method comprising the following steps of:

- carrying out at least one measurement by illuminating the sample, the X-rays reaching the detector forming a spot for each hole of the grid,
- for each measurement and for each hole of the grid, independently analysing the spot formed on the grid by determining a barycentre of the spot using a centroid search technique,
- determining an offset of the centroid from a reference centroid and then determining a local phase variation from the offset of the centroid,
- determining an amplitude of the X-rays forming the spot, and then determining a local attenuation relative to a reference amplitude,
- determining the parameter δ from the local phase variation, and
- determining the imaginary part β from the local attenuation.

The detector is advantageously a matrix detector or a CCD camera.

The grid can advantageously consist solely of squared rods delimiting holes. This means that the holes do not comprise any phase modulation elements.

In terms of amplitude measurement, the signal from all the pixels in a spot is integrated independently to define a single equivalent signal for the spot. The amplitude of this single signal is determined. The integration for one spot is independent of the integration for another spot.

The method according to the invention is an improvement on X-ray imaging techniques by providing a direct measurement that makes it possible to obtain two different and independent measurements for a same spot, the deviation and the quantity of reflected flow.

Generally speaking, in the X-ray field, the optical index, n, of a sample, whatever its nature, is written according to the following formula:

$$n = 1 - \delta + i\beta$$

with $$\delta = n_a r_e \lambda^2 \frac{f_1}{2\pi}$$

$$\beta = n_a r_e \lambda^2 \frac{f_2}{2\pi}$$

$$\beta = n_a r_e \lambda^2 \frac{f_2}{2\pi}$$

where $n_a$, $r_e$ and λ are the atomic density, the conventional electron radius and the wavelength respectively. $f_1$ and $f_2$ are the atomic scattering factors, characteristic of the chemical composition of the sample.

The present invention makes it possible to measure δ and β independently. The spots are processed independently of each other. This independence makes it possible especially to distinguish between the diffusion factors $f_{i;1}$ and $f_{i;2}$.

With the method according to the invention new dimensions (chemical composition) are added to the non-invasive study of samples by avoiding the need to cut or remove pieces of the sample. By samples, it is meant all inert or living materials.

The method according to the invention allows integrated or local measurement of the chemical composition of the sample. This technique can be used, for example, to quantify the local density of nanoparticles used to increase the effect of radio-, fermion- and hadron therapy during cancer treatment. It can also be used to quantify pollutants, for example in food processing, materials science, ecology or medicine in general.

According to one advantageous characteristic of the invention, the reference barycentre can be obtained during a measurement by illuminating the detector through the grid, without the sample or in the presence of a reference sample.

The reference amplitude can be obtained during a measurement by illuminating the detector through the grid, without the sample or in the presence of a reference sample.

The reference sample can be an object producing a known modification of the incident wave to obtain the grid-detector distance for each hole/pixel pair with very good accuracy. A diffracting hole that produces a spherical wave, a prism that is rotated or any other known object can be used.

If the size of the holes allows, it is also possible just to diffract visible or UV light. If the wavelength (spectral line, laser) is known with some accuracy, then the distance is known with the same accuracy. Whatever the shape of the hole, square, circular or other, the diffraction structure is known theoretically or numerically. Theoretically or numerically varying the grid-detector distance is then sufficient to adjust the theoretical or numerical result to the experiment and thus measure this distance. This is very accurate, for example, for a monochromatic source with a known wavelength.

According to one advantageous characteristic of the invention, the grid can consist of regularly or irregularly spaced holes.

Unlike systems of prior art imperatively requiring a regular grid, the present invention is compatible with non-regularly spaced holes but without affecting the measurement.

According to one advantageous embodiment of the invention, the pitch of the holes of the grid can be greater than or equal to the width of a pixel in the detector.

The hole size of the grid can be greater than or equal to the size of one pixel of the detector. By size, it is meant the surface area occupied by a hole or a pixel.

By sizing the holes according to the invention, stresses on the size of the detector can be relaxed. Thus, low-cost detectors can be used.

For example, in combination with all of the above, the dimensions of the grid and the distance between the source, the grid and the detector can be determined so that the spot for each hole covers several pixels of the detector.

According to one embodiment of the invention, the parameter δ can be determined using the following equation:

$\Delta\varphi = \int \delta \times dl$; Δφ being the local phase variation and 'l' the distance travelled by the X-ray.

The imaginary part β can be determined using the following equation:

$$\frac{I}{I_0} = \exp\left(-\int \frac{4\pi\beta}{\lambda} dl\right)$$

$I/I_0$ being the attenuation, λ being the wavelength of the X-ray and 'l' the distance travelled by the X-ray.

The two equations give Δφ and I/Io integrated over the propagation of X-rays in the sample. For example, in X-ray tomography, the local phase variation as well as local absorption van be found. In this case the equations transform into:

$$d\varphi = \delta \times dl$$

$$d\frac{I}{I_o} = \exp\left(-\frac{4\pi\beta}{\lambda} dl\right)$$

This shows that in X-ray tomography using an X-ray deflectometer or an X-ray interferometer, it is possible to make a 3-dimension map of the chemical composition.

According to one advantageous characteristic of the invention, the X-ray source can be a multi-energy source.

The use of several energy sources makes it possible to reach high energies.

According to the invention, it has been noticed that at high energies the difference in delta values between several chemical elements is significant enough to be able to clearly distinguish these chemical elements. At high energies, discrimination is based mainly on delta values rather than beta values. It is this change in behaviour that enables the chemical composition to be found.

Advantageously, the combined use of a grid according to the invention and a multi-energy source makes it possible especially to find the real and imaginary components of the local optical index and hence to estimate local stoichiometry of the sample.

The multi-energy source enables measurements to be taken over a wide range of energies.

The present invention,

Lens pitch: the grid is achromatic and allows multi-energy measurements without modifying the set-up: several energies to be measured without redoing the entire set-up, unlike systems for measuring δ and β with X-ray interferometers or deflectometers, which are always used at a single energy because they are highly chromatic apparatuses. It is therefore necessary to modify the set-up each time the energy is changed.

According to one embodiment of the invention, the multi-energy source can comprise an anode associated with several K-alpha type filters.

In order to restrict the spectrum, mixtures of filters can be used depending on the energy of interest, on the sample that will behave as a spectral filter and on the filters available. Typically, between 1 and 4 filters can be used, but not limited thereto.

Two cases can be contemplated: a single anode or several anodes. Changing the anode modifies the emission spectrum, mainly by the emission of the K (alpha and beta), L, M and rarely N lines, but also by the continuous braking radiation or 'bremsstrahlung'. Thus, whatever the anode, it is preferable to reduce the spectrum width by using 1 or more external filters.

According to another embodiment of the invention, the multi-energy source can comprise an X-ray emitter and several filters external to the X-ray emitter.

According to another embodiment of the invention, to obtain several different energy levels, the detector is a photon counting detector.

The photon-counting detector has electronics that enable spectral filtering of the incident radiation. In this case, it is no longer necessary to put external filters. It may still be advantageous to use multiple anodes to use K, L, M or N line emissions.

According to one embodiment of the invention, for a non-pure sample, carrying out several measurements at different energy levels.

For example, for a pure material, it may be advantageous to use at least two energies, either by using filters or with the photon counting detector.

Advantageously, 2i measurements can be carried out at different energies, 'i' being the total number of chemical elements contained in the sample.

Indeed, in the case of mixtures or non-pure materials, the previous equations of δ and β become, $$\delta = r_e\lambda^2 \frac{\left(\sum n_{a,i} f_{i;1}\right)}{2\pi}$$

$$\beta = r_e\lambda^2 \frac{\left(\sum n_{a,i} f_{i;2}\right)}{2\pi}$$

where the subscript i indicates the 'i-th' component in the mixture.

From these equations, it is noticed that $n_{a,i}$, thus the atomic density of a specific element or all the $n_{a,i}$ in the mixture can be found by measuring at different wavelengths δ and β.

In the event of a search for chemical composition without any prior knowledge, 2i measurements are taken at independent energies. In fact, $f_{i;1}$ and $f_{i;2}$ follow well-known laws of course with energy and can therefore easily be used to reduce the number of measurement points. For example, sudden variations in δ and especially β corresponding to proximity to a threshold can be detected.

Furthermore, when the materials making up the sample are known, i/2 measurements can be taken at different energies, 'i' being the total number of chemical elements contained in the sample.

If the materials in the sample are known, i.e. $f_{i;1}$ et $f_{i;2}$, i/2 measurements can be taken at different energies to find the density of each chemical element. This considerably reduces the number of measurements needed to find parameters δ and β.

Finally, a priori knowledge of the sample, such as the total or local density, of the chemical molecules that may be present, etc., can further reduce the number of independent measurements.

According to another aspect of the invention, an X-ray or X-ray tomography system is provided for implementing the method as described above.

It is therefore possible to measure δ and β by X-ray or X-ray tomography using the components according to the invention. The only difference between the two techniques lies in the number of viewing angles and therefore in the possibility of reconstructing the sample in 3 dimensions for X-ray tomography.

BRIEF DESCRIPTION OF THE DRAWINGS

Further advantages and characteristics of the invention will become apparent upon examining the detailed description of a non-limiting method of implementation, and the appended drawings, in which:

FIG. 1 is a simplified schematic view of a system according to the invention for implementing the method according to the invention;

FIG. 2 is a curve illustrating the variation of δ as a function of X-ray energy;

FIG. 3 is a curve illustrating the variation of β as a function of X-ray energy;

FIG. 4 is a curve illustrating the course of delta and beta values as a function of energy for chemical element $Si_3N_4$; and FIG. 5 is a curve illustrating the course of delta and beta values as a function of energy for the chemical element Si.

DETAILED DESCRIPTION

The embodiments that will be described hereinafter are by no means limiting; it will be possible especially to implement alternatives of the invention comprising only a selection of the characteristics described hereinafter in isolation from the other characteristics described, if this selection of characteristics is sufficient to confer a technical advantage or to differentiate the invention from the state of prior art. This selection comprises at least one preferably functional characteristic without structural details, or with only part of the structural details if this part alone is sufficient to confer a technical advantage or to differentiate the invention from the state of prior art.

In particular, all the alternatives and all the embodiments described are intended to be combined with each other in all combinations where there is nothing to prevent this from a technical point of view.

In FIG. 1, a multi-energy source 1 able to emit X-rays in the direction of a sample 2 comprising several chemical elements with different optical indices is distinguished.

After passing through the sample 2, X-rays pass through a grid 3 comprising holes 4 which may or may not be regularly distributed.

A detector 5 is disposed after the grid 3 so that an X-ray generated by the source 1 first passes through the sample 2, then the grid 3 and is finally detected by pixels 6 of the detector 5.

Each hole 4 in the grid 3 has a larger surface area than each pixel 6 in the detector 5.

The arrangement between the source 1, the grid 3 and the detector 5 is determined so that X-rays passing through a hole in the grid 3 form a spot 7 on the detector 5, this spot 7 at least partially covering several pixels of the detector 5.

There is also a processing unit 8 equipped with the software and hardware means necessary for the method according to the invention to be implemented. This processing unit 8 is especially connected to the source 1 and to the detector 5 to control emission of X-rays and to process signals received at the detector.

The X-ray source may comprise a 50 W tungsten anode.

The grid 3 is a transmission grid with 300×300 holes.

The shape of the holes may be any of square, circular or other. The spacing of the holes is related to the hole size. It is preferable to leave at least 1 pixel between the diffraction spots recorded on the detector. On the other hand, the size of the spots depends on the energy of the X-rays, the shape and size of the holes and the grid-detector distance. It is therefore a multi-parameter optimisation. A Talbot distance is not used. The distance can be any distance.

With the grid 3, X-rays project the pattern of the grid achromatically onto the camera with diffraction.

Detector 5 is a water-cooled X-ray camera. The camera comprises a 16-bit CCD matrix with a matrix size of 2045×2048 and a pixel size of 30 μm.

The detector can be a CCD, CMOS, photon counting or a luminescent plate detector coupled with visible imaging and a visible detector (CCD or CMOS). The number of pixels is not set. In general, it is a compromise between price and the greatest number. The pixel size is not set. It is a compromise between what exists, small pixels for good sampling and pixels that are not too small for good dynamic range.

The sample 2 can advantageously be defined by its optical index n according to the formula:

$$n = 1 - \delta + i\beta$$

with $$\delta = n_a r_e \lambda^2 \frac{f_1}{2\pi}$$

$$\beta = n_a r_e \lambda^2 \frac{f_2}{2\pi}$$

where $n_a$, $r_e$ and λ are the atomic density, the conventional electron radius and the wavelength respectively. $f_1$ and $f_2$ are the atomic scattering factors, characteristic of the chemical composition of the sample.

The parameter β is responsible for the attenuation of X-rays through the sample.

The parameter δ is responsible for phase effects. When X-rays pass through the sample, they undergo phase changes that are especially a function of δ. The grid enables these phase changes to be conveyed as spot offsets on the detector.

To measure β and δ, a measurement at no load, i.e. without a sample, is carried out to determine a reference amplitude and a reference position for each spot. A second measurement is then taken to determine the difference in amplitude and the offset of the spot. It is planned to carry out the measurement at no load for each energy considered. This enables the measurement row to be calibrated.

During a measurement, the image obtained on the detector is an interferogram, giving access to phase gradients in two dimensions. The interferogram is the set of spots on the detector, these spots being formed by the X-rays passing through the holes of the grid. These spots are also a function of the path of the X-rays through the sample. By analysing these spots, it is possible to find parameters β and δ.

In other words, the phase variations introduced by the sample placed in the optical path of the X-rays cause a deformation of the interferogram, the analysis of which gives access to the phase gradients of the sample.

The phase variation, Δφ, induced by the sample directly gives δ according to the formula:

$\Delta\varphi = \int \delta \times dl$, 'l' being the distance travelled by the X-ray.

The absorption, I/Io, of the radiation gives β according to the formula:

$$\frac{I}{I_0} = \exp\left(-\int \frac{4\pi\beta}{\lambda} dl\right),$$

λ being the wavelength of the X-ray and 'l' the distance travelled by the X-ray.

These two formulae give Δφ and I/Io integrated on the propagation of X-rays in the sample. In X-ray tomography, the local phase variation as well as local absorption can be found. In this case the equations become:

$$d\varphi = \delta \times dl$$

$$d\frac{I}{I_o} = \exp\left(-\frac{4\pi\beta}{\lambda} dl\right)$$

To measure Δφ and I/Io, centroid search techniques are applied to find the barycentre of a spot of any shape with accuracy, and the signal from all the pixels forming a spot is integrated independently to define a signal corresponding to a hole.

These measurements are carried out without the sample and then with the sample.

In centroid search techniques, the weighted moment calculation technique and/or the iterative weighted Gaussian technique can be used. Especially, the first technique can be used and the result can then be refined using the second technique.

The difference in centroid positions between a current measurement and the reference measurement gives the refraction and therefore parameter δ.

The difference in amplitude of the signals from each hole between a current measurement and the reference measurement gives the transmission, and therefore parameter β.

With a same spot, two measurements are made independently: the deviation and the quantity of reflected flow.

The invention therefore enables δ and β to be independently measured, especially over a wide range of energies.

The technique according to the invention makes it possible to limit errors.

Instead of the sample, an object producing a known change in the incident wave can be used for the reference measurement to obtain the grid-detector distance for each hole/pixel pair with very good accuracy. A diffracting hole that produces a spherical wave, a prism that is rotated or any other known object can be used.

FIGS. 2 and 3 illustrate, for example, the variation in δ and β as a function of X-ray energy, for breast tissue and for different shapes of micro-calcifications. Some forms are benign, others malignant.

FIGS. 4 and 5 illustrate the course of delta and beta values as a function of energy. Two chemical elements desired to be distinguished, Si and $Si_3N_4$ are seen. If the measurement is made at 4 keV, delta_ of $Si_3N_4$ is equal to about $4.5*10^{-5}$ and beta of $Si_3N_4$ is equal to about $1.5*10^{-6}$. This compares with the delta of Si which is about $3*10^{-5}$ and the beta of Si which is about $1.5*10^{-6}$. The only difference is on delta and it is very small, so there is a source of error. But if the behaviour at 2 or more energies is looked at, significant thus usable differences are seen in this case. Thus at 10 keV, delta of Si3N4 is equal to about $7.5*10^{-6}$ and beta of $Si_3N_4$ is equal to about $7*10^{-8}$, compared with delta of Si equal to about $5*10^{-6}$ and beta of Si equal to about $7*10^{-8}$. At high energies, the difference is on delta and no longer on beta. It is this change in behaviour that makes it possible to find the chemical composition.

With the present invention, a single grid is used, which represents a clear advantage in terms of alignment, stability and robustness. This grid necessitates few requirements in terms of resolution and hole sizing. This means that there are also few technological requirements on the detector used.

The system according to the invention is compatible with high numerical aperture radiation, which will improve the spatial resolution on the sample. It is thus possible to design monolithic, and therefore robust, systems.

Of course, the invention is not limited to the examples just described and many adjustments can be made to these examples without departing from the scope of the invention.

The invention claimed is:

1. A phase-contrast imaging method for estimating local stoichiometry of a sample by determining a parameter δ of a real part and an imaginary part β of a complex optical index of the sample; the method is implemented using an X-ray source for illuminating the sample disposed between the source and a detector, a grid consisting of holes disposed between the sample and the detector, and a unit for processing signals from the detector;

the method comprising the following steps of:

carrying out at least one measurement by illuminating the sample, the X-rays reaching the detector forming a spot for each hole of the grid;

for each measurement and for each hole of the grid, independently analysing the spot formed on the grid by determining a barycentre of the spot using a centroid search technique;

determining an offset of the centroid from a reference centroid and then determining a local phase variation from the offset of the centroid;

determining an amplitude of the X-rays forming the spot, and then determining a local attenuation relative to a reference amplitude;

determining the parameter δ from the local phase variation; and determining the imaginary part β from the local attenuation, wherein, for a non-pure sample, carrying out a plurality of measurements at different energy levels:

2i measurements are carried out at different energies, or when materials making up the sample are known, i/2 measurements are carried out at different energies, 'i' being a total number of chemical elements contained in the sample.

2. The method according to claim 1, characterised in that the reference barycentre is obtained during a measurement by illuminating the detector through the grid, without the sample or in a presence of a reference sample.

3. The method according to claim 1, characterised in that the reference amplitude is obtained during a measurement by illuminating the detector through the grid, without the sample or in a presence of a reference sample.

4. The method according to claim 1, characterised in that the grid consists of regularly or irregularly spaced holes.

5. The method according to claim 1, characterised in that a hole pitch of the grid is greater than or equal to a size of a pixel of the detector.

6. The method according to claim 1, characterised in that a hole size of the grid is greater than or equal to a width of a pixel of the detector.

7. The method according to claim 1, characterised in that dimensions of the grid and a distance between the source, the grid and the detector are determined so that the spot for each hole covers several pixels of the detector.

8. The method according to claim 1, characterised in that the parameter δ is determined using the following equation:

$\Delta\varphi=\int\delta\times l dl$; Δφ being the local phase variation and 'l' a distance travelled by the X-ray.

9. The method according to claim 1, characterised in that the imaginary part β is determined using the following equation:

$$\frac{I}{I_0} = \exp\left(-\int\frac{4\pi\beta}{\lambda}dl\right)$$

$I/I_0$ being the attenuation, λ being a wavelength of the X-ray and 'l' a distance travelled by the X-ray.

10. The method according to claim 1, characterised in that the X-ray source is a multi-energy source.

11. The method according to claim 1, characterised in that in order to obtain different energy levels, the detector is a photon counting detector.

12. An X-ray radiography system for implementing the method according to claim 1.

13. An X-ray tomography system for implementing the method according to claim 1.

14. The method according to claim 10, characterised in that the multi-energy source comprises an anode associated with K-alpha type filters.

15. The method according to claim 10, characterised in that the multi-energy source comprises an X-ray emitter and a plurality of filters external to the X-ray emitter.

16. A phase-contrast imaging method for estimating local stoichiometry of a sample by determining a parameter δ of a real part and an imaginary part β of a complex optical index of the sample; the method is implemented using an X-ray source for illuminating the sample disposed between the source and a detector, a grid consisting of holes disposed between the sample and the detector, and a unit for processing signals from the detector;

the method comprising the following steps of:

carrying out at least one measurement by illuminating the sample, the X-rays reaching the detector forming a spot for each hole of the grid;

for each measurement and for each hole of the grid, independently analysing the spot formed on the grid by determining a barycentre of the spot using a centroid search technique;

determining an offset of the centroid from a reference centroid and then determining a local phase variation from the offset of the centroid;

determining an amplitude of the X-rays forming the spot, and then determining a local attenuation relative to a reference amplitude;

determining the parameter δ from the local phase variation; and determining the imaginary part β from the local attenuation, wherein the parameter δ is determined using the following equation:

$\Delta\varphi=\int\delta\times l dl$; Δφ being the local phase variation and 'l' a distance travelled by the X-ray.

17. A phase-contrast imaging method for estimating local stoichiometry of a sample by determining a parameter δ of a real part and an imaginary part β of a complex optical index of the sample; the method is implemented using an X-ray source for illuminating the sample disposed between the source and a detector, a grid consisting of holes disposed between the sample and the detector, and a unit for processing signals from the detector;

the method comprising the following steps of:

carrying out at least one measurement by illuminating the sample, the X-rays reaching the detector forming a spot for each hole of the grid;

for each measurement and for each hole of the grid, independently analysing the spot formed on the grid by determining a barycentre of the spot using a centroid search technique;

determining an offset of the centroid from a reference centroid and then determining a local phase variation from the offset of the centroid;

determining an amplitude of the X-rays forming the spot, and then determining a local attenuation relative to a reference amplitude;

determining the parameter δ from the local phase variation; and determining the imaginary part β from the local attenuation, wherein the imaginary part β is determined using the following equation:

$$\frac{I}{I_0} = \exp\left(-\int \frac{4\pi\beta}{\lambda} dl\right)$$

$I/I_0$ being the attenuation, λ being a wavelength of the X-ray and 'l' a distance travelled by the X-ray.

* * * * *